July 8, 1958 — M. P. BAKER — 2,841,967
UNIVERSAL JOINT
Filed Sept. 6, 1956

INVENTOR.
Max P. Baker
BY
His Attorney

United States Patent Office 2,841,967
Patented July 8, 1958

2,841,967

UNIVERSAL JOINT

Max P. Baker, Dayton, Ohio, assignor to General Motors Corporation, Detroit, Mich., a corporation of Delaware Application September 6, 1956, Serial No. 608,274

3 Claims. (Cl. 64—16)

This invention relates to universal joints.

It is an object of this invention to provide a universal coupling which is simple in construction, economical to manufacture and which will facilitate an effective operative connection between driving and driven shafts, either axially aligned or disposed in an angular relationship. In its preferred form the coupling involves a structure capable of absorbing considerable torque shock without damage thereto, which involves a minimum of backlash and which is smooth and efficient in operation.

A more specific object of the invention is to provide a universal joint which includes a pair of bifurcated socket members disposed in nested relationship which are joined for universal movement by means of a ball-like member.

A further object of the invention is to provide a universal joint including a pair of bifurcated socket members disposed in nested relationship and joined by a moldable high impact synthetic resin ball-like member molded in place between the nested bifurcated members wherein the ball-like member and bifurcated members are shaped so that partially cylindrical portions of the ball-like member engage internal segmental cylindrical surfaces of each bifurcated member and segmental conical surfaces associated with the ball-like member occupy the space between adjacent furcations of the nested bifurcated members and engage complementary segmental conical surfaces thereof to constitute a smooth operating universal joint having a minimum degree of backlash.

Further objects and advantages of the present invention will be apparent from the following description, reference being had to the accompanying drawings wherein preferred embodiments of the present invention are clearly shown.

In the drawings:

Referring now to the drawings Figure 1 is an elevation view of a preferred embodiment of a universal joint having shaft connecting members in an aligned position.

Figure 1:
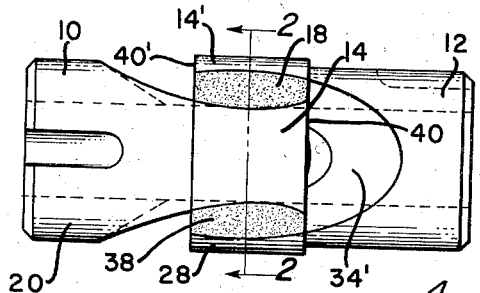
Figure 5:
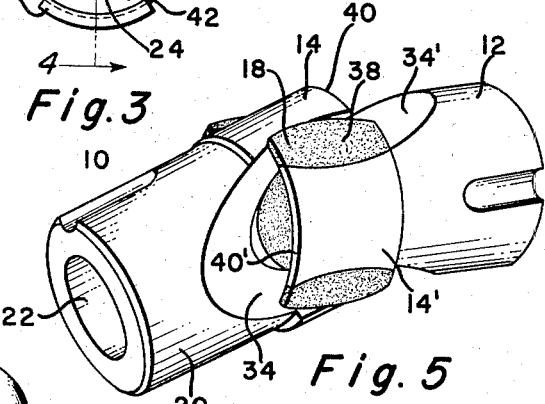
Figure 5 is the universal joint of Figure 1 having shaft connecting portions in an aligned position.

Referring now to the drawings, a preferred embodiment of the invention is shown in assembled form in Figures 1 and 5 and consists of a pair of identical shaft connecting members 10 and 12 having bifurcated end portions 14 and 14' respectively joined by a ball-like member 18 molded in place and preferably formed of a moldable high impact synthetic resin.

Figure 3:
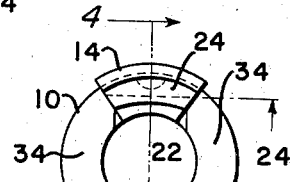
Figure 3 is a front end view of a bifurcated shaft connecting member.
Figure 4:
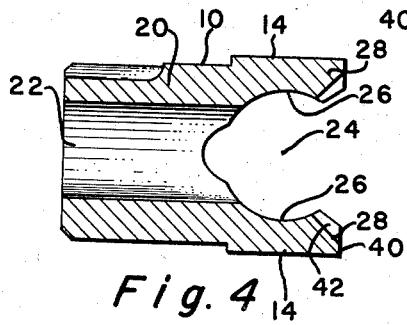
Figure 4 is a cross sectional view of a shaft connecting member bifurcated taken along line 4—4 of Figure 3.

Figure 3 shows one of an identical pair of connecting members as for example 10 of Figure 1 viewed from the bifurcated end and Figure 4 shows a cross section of the connecting portion taken along line 4—4 of Figure 3. As shown in Figure 4 the bifurcated connecting portion in preferred form includes a shank portion 20 which is provided with a longitudinal opening or bore 22 therethrough adapted to receive a shaft or the like. The furcated portions 14 of each connecting member are in the form of spaced prongs having a partially cylindrical bore 24 therebetween having partially cylindrical surfaces 26. The bore 24 is positioned so that end portions of the furcations 24 terminate in enlarged portions 28.

Figures 7, 8:
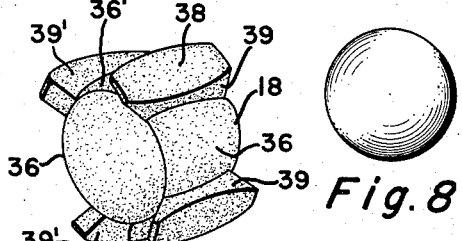
Figure 7 is a preferred form of a ball-like member for joining the bifurcated members.
Figure 8 is a spherical ball which may be used for joining the bifurcated members.
Figure 6:
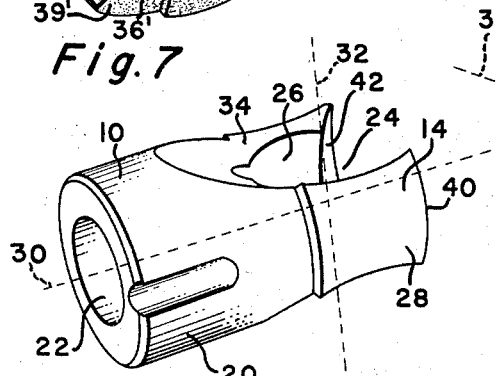
Figure 6 is a perspective exploded view showing shaft connecting members having complementary bifurcated end portions.

Figure 6 shows the complementary shaft connecting members 10 and 12 in spaced relation. The longitudinal axis of member 10 is indicated by the dotted line 30 and the longitudinal axis of the partially cylindrical opening 26 is indicated by the dotted line 32. Similarly on the mating connecting member 12, the former axis is shown by dotted line 30' and the latter by dotted line 32', respectively. It may be readily visualized that when the members 10 and 12 are moved into a nested relationship so that the axes 30 and 30' thereof are aligned and the axes 32 and 32' intersect and are perpendicular to one another, the cylinder portions 26 and 26' between the opposed furcations define a cavity having curved surfaces capable of snugly and slidably receiving a spherical ball as for example is shown in Figure 8. The ball-like member operates to hold the members 10 and 12 in a locked relationship capable of universal movement.

Preferably the side faces of the furcated portions of the connecting member 10 are provided with segmental right conical surfaces 34. These surfaces may be described as segments of a right cone having its apex positioned at the intersections of axes 30 and 32 and its altitude positioned coincidental with the axis 32. In other words these surfaces may be described as generated by the rotation of a right triangle having a leg coincidental with axis 32 and terminating at the intersection of axes 30 and 32, the other leg being positioned outwardly of the said intersection. The sides of the furcated portions of connecting member 12 are similarly provided with segmental right conical side surfaces 34' as has been described in connection with the side surfaces 34 of connecting member 10.

A ball-like member as is shown in Figure 7 is preferably molded in situ between the bifurcated members nested as described above in connection with Figure 6. To this end mold members (not shown) are suitably placed about the joint in a manner obvious to one skilled in the art so that the resulting ball-like member has partial cylindrical portions 36 and 36' corresponding to the cylindrical surfaces 26 and 26' respectively which fills the cavity between the furcations 14 and 14' and insert portions 38 which fill the space between the adjacent furcations as for example 14 and 14' shown in Figure 5. Joint members 10 and 12 are preferably formed to have a cylindrical outer configuration as is shown in the drawings and the insert portions 38 are similarly molded to form a cylindrical outer surface. The ball-like member 18 is further preferably formed to extend flush with the ends 40 and 40' of the furcations.

In operation the connecting member 10 is free to oscillate in a first plane as permitted by the cylindrical portion 26 and the corresponding surfaces 36 of the ball-like member 18, and the member 12 is free to oscillate in another plane perpendicular to the first plane as permitted by the cylindrical portion 26 and the corresponding surfaces 36' of the member 18. Relative movement between the members 10 and 12 is further permitted by reason of the insert portions 38 having side conical surfaces 39 and 39' corresponding to the conical surfaces 34 and 34', in a manner illustrated in Figure 5.

Figure 2:
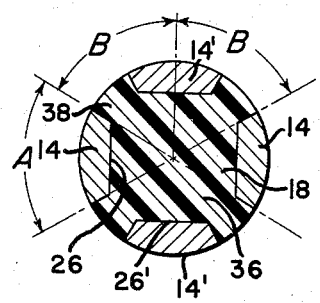
Figure 2 is a cross sectional view taken along lines 2—2 of Figure 1.

As may be seen in reference to Figure 2 the furcations 14 and 14' are of a width so as to provide insert portions 38 of substantial volume capable of withstanding the compressive forces involved in transmitting torque through the joint. Accordingly it may be seen that a given furcation must subtend an arc A of less than 90°. Expressed in another way the angle B between the slant height and the altitude of the above mentioned cone must be greater than 45°. The exact dimensions are matters of design depending for example on the amount of torque applied to the coupling and the nature of the material of which ball-like member 18 is made. The insert portions 38 permit smooth universal movement of the joint with a minimum of backlash.

The ball-like member 18 is preferably molded in situ of a high impact synthetic resin. Examples of suitable materials include fiber filled phenolic resins such as a phenol formaldehyde resin and fiber filled polyamine materials such as are disclosed in the U. S. Patents 2,071,253 and 2,130,948. The former material may include suitable proportions of graphite and the latter may include suitable proportions of graphite or molybdenum disulfide to provide the joint with self-lubricating properties. It is also within the scope of the invention to make the ball-like member 18 of a suitable metal and to fabricate the connecting portions 10 and 12 in longitudinally split sections permitting an assembly of the joint parts which may be secured by bolts or other means after assembly of the parts.

Fabrication of the joint by providing the integral units 10 and 12 and molding the ball-like member 18 therebetween in assembled relation provides a distinct advantage in the simplicity and economy of manufacture. A connecting member such as the member 10 may be readily made from a cylindrical bar of metal stock. The bore 22, Figure 6, is first provided in the cylindrical bar. Thereafter the suitably positioned bore 24 is provided which forms the bifurcations and the requisite cylindrical surfaces between. Next the conical surfaces 34 are provided with a suitable conically shaped grinding tool and finally beveled ends 42 and 42', are formed preferably of partially conical surface configuration to provide for sufficient clearance of the parts in operation.

While the embodiments of the present invention as herein disclosed constitute a preferred form, it is to be understood that other forms might be adopted.

What is claimed is as follows:

1. A universal joint comprising a pair of relatively rotatable shaft members, each of said shaft members having a two pronged fork associated therewith aligned in a plane, the prongs of each of said forks being shaped to provide a segmental cylindrical opening therebetween having the longitudinal axis thereof perpendicular to the plane of said prongs, the said segmental cylindrical openings of each fork member being of equal diameter, each of said forks further being formed to have each side surface thereof which is parallel to said plane shaped in the form of identical segmental right circular conical surfaces having the vertices thereof located at the geometric center of said cylindrical openings and having the altitudes thereof perpendicular to said planes, the angle between the altitudes and slant heights of said conical surfaces being greater than 45°, said forks being arranged to have the geometric centers of their cylindrical openings coincide, and a member comprising moldable high impact material molded in situ and joining said fork members for universal movement of said shaft members.

2. In a universal joint, a socket member having a bifurcated end, the bifurcated end portions being aligned in a plane, a segmental cylindrical opening located between the bifurcated end portions having its longitudinal axis perpendicular to said plane, the bifurcated ends being further formed to have each side thereof which is parallel to said plane shaped in the form of identical segmental right circular conical surfaces having the vertices thereof located at the geometric center of said cylindrical openings and having the altitudes thereof perpendicular to said plane, the angle between the altitudes and slant heights of said conical surfaces being greater than 45°.

3. In a universal joint, a socket member having a bifurcated end, the bifurcated end portions being aligned in a plane, a segmental cylindrical opening located between the bifurcated end portions having its longitudinal axis perpendicular to said plane, the bifurcated ends being further formed to have each side thereof which is parallel to said plane shaped in the form of identical segmental right circular conical surfaces having the vertices thereof located at the geometric center of said cylindrical openings and having the altitudes thereof perpendicular to said plane, the angle between the altitudes and slant heights of said conical surfaces being greater than 45°, said member including portions projecting outwardly thereof having opposed segmental right conical surfaces complementary to the said conical surfaces of said forks interposed between adjacent prongs and snugly engaging said conical fork surfaces coextensively thereof when said shaft members are in an aligned position.

References Cited in the file of this patent

UNITED STATES PATENTS

| | | |
|---|---|---|
| 225,126 | Hayes | Mar. 2, 1880 |
| 2,251,126 | Gatke | July 29, 1941 |
| 2,402,006 | Anderson | June 11, 1946 |
| 2,641,115 | Garrison | June 9, 1953 |

FOREIGN PATENTS

| | | |
|---|---|---|
| 418,541 | Great Britain | Oct. 26, 1934 |